Oct. 20, 1931.　　　　R. JOKSCH　　　　1,827,848
INDICATING MECHANISM FOR WEIGHING APPARATUS
Filed March 7, 1929　　　4 Sheets-Sheet 1
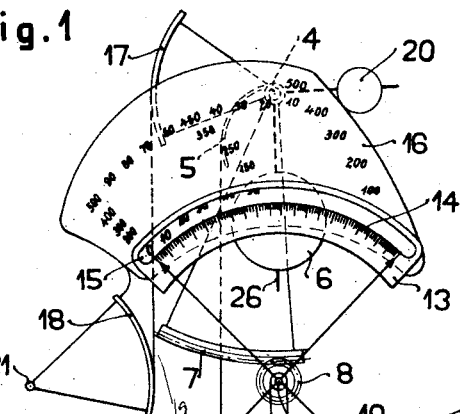
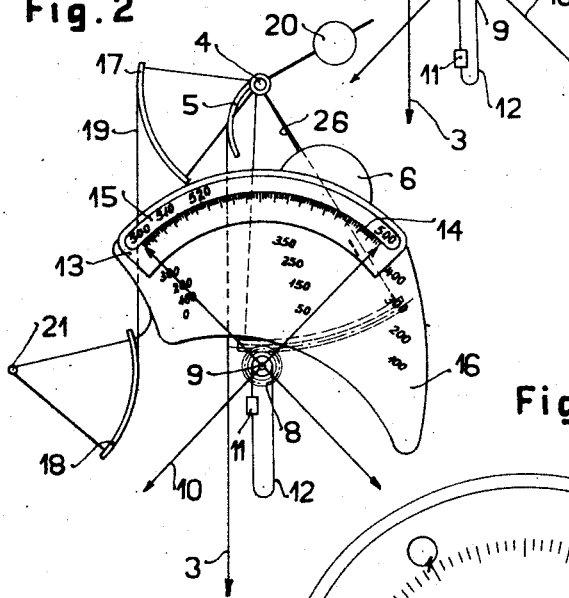
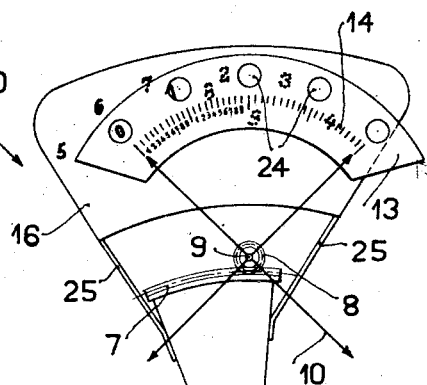
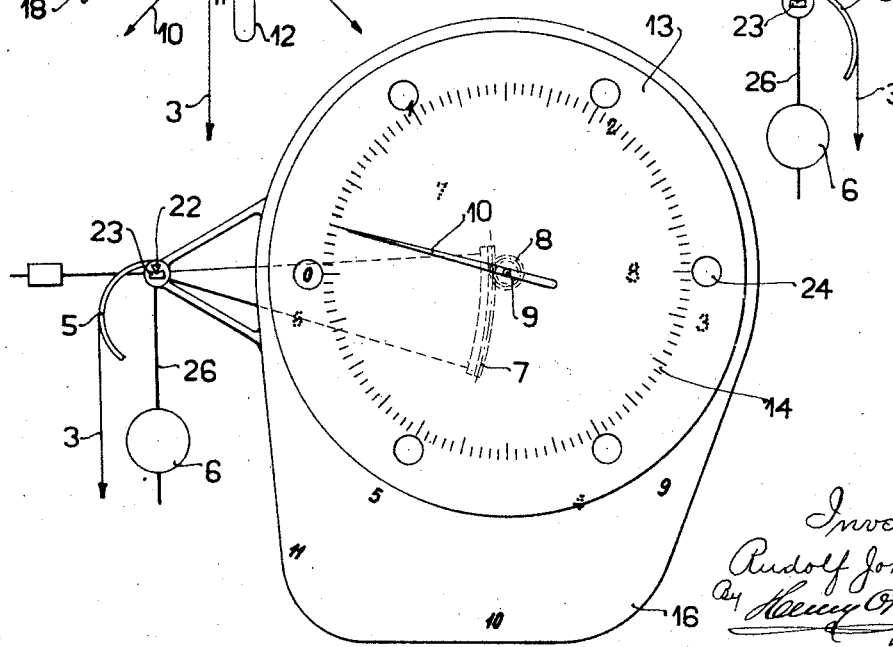
Inventor
Rudolf Joksch Oct. 20, 1931.  R. JOKSCH  1,827,848
INDICATING MECHANISM FOR WEIGHING APPARATUS
Filed March 7, 1929  4 Sheets-Sheet 3
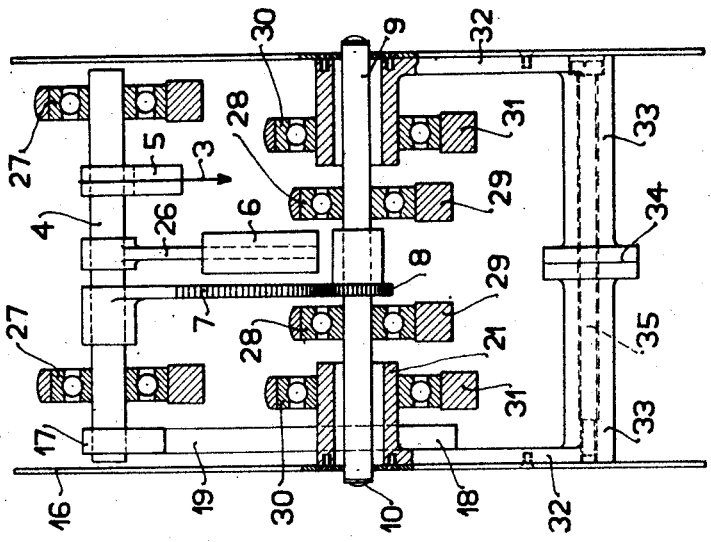
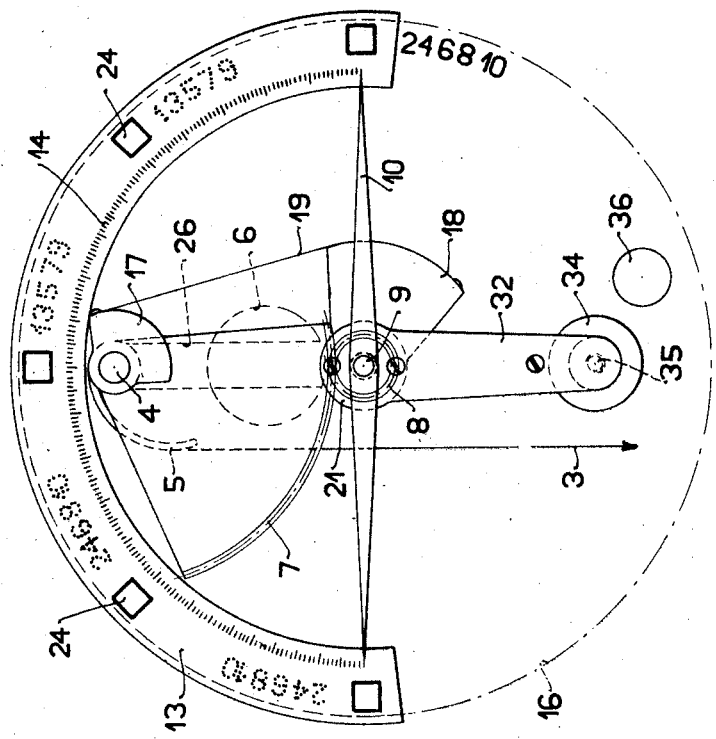
Inventor
Rudolf Joksch
By Henry Orth
Atty.

Oct. 20, 1931.  R. JOKSCH  1,827,848
INDICATING MECHANISM FOR WEIGHING APPARATUS
Filed March 7, 1929  4 Sheets-Sheet 4

Patented Oct. 20, 1931

1,827,848

UNITED STATES PATENT OFFICE

RUDOLF JOKSCH, OF VIENNA, AUSTRIA

INDICATING MECHANISM FOR WEIGHING APPARATUS

Application filed March 7, 1929, Serial No. 345,098, and in Austria May 22, 1928.

My invention relates to indicating mechanism for weighing apparatus with a load balancing weighted pendulum having a relatively large weighing range while on the other hand a high accuracy of reading is to be obtained by arranging the graduation marks for the units at a comparatively large distance.

Indicating mechanism for weighing apparatus of this type having a cycloidal scale with unequal graduation such as described in my prior Patent No. 1,661,291 have already been proposed. In said earlier construction the graduation scale is connected to and oscillating together with the weighted pendulum. In order to avoid cycloidal scale curves and the unequal distance between the graduation marks along said curves according to my present invention only the value numerals alloted to the graduation marks are arranged on a separate numeral disk which is shifted relatively to the graduation scale itself which may be a fixed one. The graduation in this case may also be made uniform throughout its whole length for instance by a known expedient, such as the insertion of a suitable variable transmission gearing, an excentric disc or cam or the like in the driving mechanism of the indicator shaft, the pointer moving only along said uniform graduation, while the reading is taken upon the numerals arranged on the moving disk.

The graduation may be spread either along an arc of a circle or along a complete circle and it will act exactly in the same manner as a chart or disk of the known type with a continuous graduated cycloidal curve, if it is located adjacent a window or a slot within which the value numerals to be ascribed to the marks will appear.

The chart or dial carrying said numerals as described in my above mentioned earlier Patent No. 1,661,291 may be directly or indirectly connected with the load balancing pendulum carrying the counterpoise. By means of said dial the required value is ascribed to the graduation mark to which the indicator arm is pointing for the time being or to the mark of an adjacent unit or half unit of the graduation when reading is taken. Moreover, for the sake of presenting better aspect to the eye instead of continuous slots separate windows for certain graduation marks only may be provided.

According to a further modification of my invention a separate indication of the lower and the higher units may be provided for by means of a single pointer and a single graduation and this is obtained according to my invention by using a pointer or a set of pointers moving upon a fixed circular graduation upon which the marks and numerals for the smaller units are inscribed, while at the same time slots or windows are provided at certain intervals into which the value numerals for the higher units may enter. Said numerals are arranged on a chart rotatable about the same axis as the pointer itself, which will only contain said value numerals for the higher units.

The numeral chart or dial is rotated simultaneously with the pointer itself and such rotation is derived directly from the load balancing pendulum carrying the counterpoise. This rotation causes the value numerals for the higher units to enter into the slots which are arranged above or below the graduation proper or on both sides of the same and the necessary correspondence between the movement of the chart or dial carrying the value numerals and the movement of the pointer is secured by means of a driving mechanism which will drive the rotating value numeral chart by means of a suitable gearing.

The invention is illustrated in the accompanying drawings by way of example, in which Fig. 1 shows a weighing apparatus provided with a set of pointers moving on a circular scale and in which the chart or dial carrying the value numerals is driven by the pendulum lever by means of a transmission gearing. Fig. 1ª is a vertical section of a complete scale embodying the structure shown in Fig. 1.

Fig. 2 shows the same arrangement with the pointer and chart or dial, carrying the value numerals, in another position from that shown in Fig. 1.

Fig. 3 shows a modification of the arrangement shown in Figs. 1 and 2, wherein instead of a slot showing a continuous series of figures circular or other windows are provided within which the numerals appear.

Fig. 4 shows a similar arrangement wherein instead of a graduation covering only an arc and provided with a plurality of pointers on the same axis, a single pointer capable of performing a rotation of more than 360° is arranged.

Fig. 5 shows a further modification with a fixed scale and with a series of slots on it in which the value numerals for the smaller units are fixed numerals marked on the scale itself while the value numerals of the higher units will appear in windows of said graduation scale.

Fig. 6 shows a cross section and part side view of the weighing apparatus according to Fig. 5.

Figure 1A:
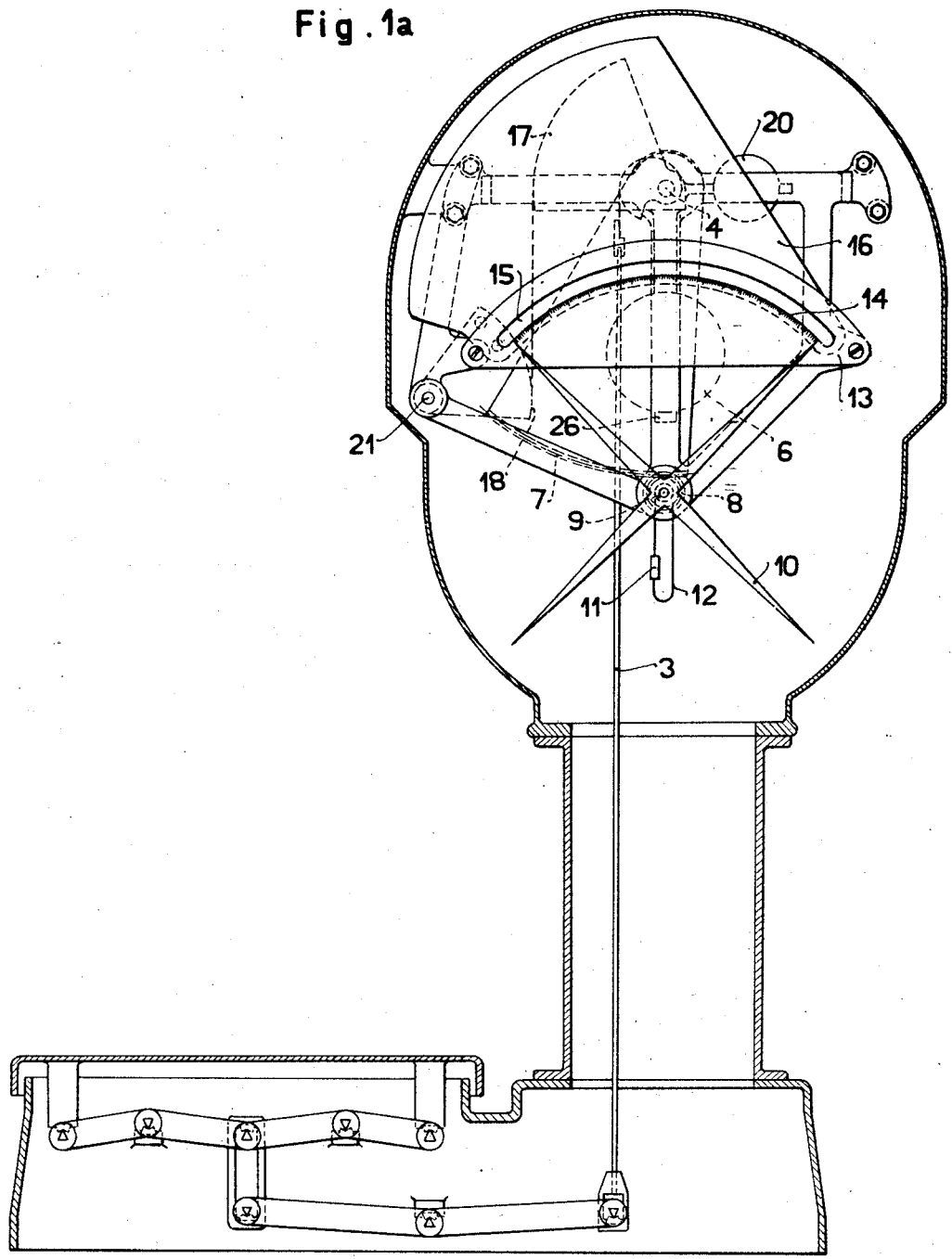

In the structure shown in Figs. 1, 1ª and 2, the load acts by way of a band, wire or other suspension means 3 not capable of being stretched upon the shaft 4 by means of eccentric cam disk 5. As by means of said eccentric cam disk the load will act with a variable lever arm on the pendulum carrying the counterpoise 6, by this arrangement a uniformly graduated scale is obtained. On the shaft 4 the pendulum carrying the counterpoise 6 and the circular segment 7 are arranged, the latter meshing with a small toothed wheel 8 upon the indicator shaft carrying the pointer 10.

The segment and wheel may be provided with teeth having a large amount of play and they are continuously pressed against each other by a small weight 11 suspended upon a drum on said indicator shaft. The pointer shaft 9 carries in this instance four pointers 10 arranged at right angle to each other which come subsequently into play along a circular graduation scale 14. The pointers must be so arranged that when one pointer leaves the graduation scale 14 the next pointer begins to play along the same. The graduation scale which has a uniform graduation is arranged on a support 13 fixed with respect to the pointer shaft and a slot 15 is arranged immediately above the said graduation 14 in order to display the value numerals which are to be ascribed to the graduation marks.

Said value numerals are all arranged upon a dial 16 moved by a suitable transmission from the pendulum carrying the counterpoise 6. On said dial a plurality of series of numerals are arranged along epicycloidal curves which curves may be constructed by following the path of the pointer which is a circular path upon the oscillating dial. On account of this fact not all the numerals of a series are displayed within the slot 15, above the graduation scale 14, as said slot has the form of an arc of a circle, but only those numerals appear within the slot which correspond to the graduation marks over which the pointer is playing for the time being.

The numeral chart or dial 16 carrying the value numerals for the graduation scale 14 is driven either by a direct lever connection or as shown may be driven from the shaft 4 by means of a segment 17 that drives a second circular segment 18 by means of the steel band 19 stretched by a small weight 20. The segment 18 is arranged to be rotatable around an axis 21 which is in rigid connection with the numeral chart or dial 16.

When the pan of the weighing mechanism shown in Fig. 1ª is loaded as shown in Fig. 2, the movement of the counterpoise 6 and of the pendulum respectively is transmitted by means of the two segments 17 and 18 and of the steel band 19 to the numeral chart or dial 16, whereby the series of numerals which will correspond to the load put upon the scale pan and therefore also correspond to the movement of the pendulum will be displayed within the slot 15 above the graduation 16 and the correct numerals are therefore approaching the graduation marks over which the pointer is playing for the time being.

In the modification according to Fig. 3 the general arrangement is similar to that shown in Figs. 1 and 2; the load acts upon the pendulum 26 carrying the counterpoise 6 by means of a steel band 3 and by means of an eccentric cam or disk 5. Said pendulum is suspended by means of a knife edge 22 within a pan 23 fixed to the frame of the weighing mechanism. The rotation of the indicator shaft 9 is obtained by means of the toothed segment 7 and the toothed wheel 8. A fixed part 13 carries the uniformly graduated scale 14 but in this case instead of a slot arranged above said graduation scale only a plurality of windows 24 are arranged above the principal graduation marks of the sacle 14 and the numerals on the chart or dial 16 appear in said windows so that reading of the weight can take place.

In this case the graduation marks may carry part of the numerals and especially the numerals for the small units while the numerals for the higher units which are to be ascribed to the principal marks of the graduation are arranged on the movable chart or dial. Also with this way of ascribing values to the graduation marks it is possible to use the same graduation scale for varying indications when the values for the principal graduation marks vary.

As will be seen from the figure, the numeral chart or dial 16 is driven in the same way as that shown in Figs. 1 and 2 from the counterpoise 6 or the pendulum 26 directly, for which purpose the chart or dial is rigidly connected by means of arms 25 to the segment 7 which moves together with the pendulum 26.

In the modification shown in Fig. 4 the same general arrangement is adopted but instead of arranging a plurality of pointers a single pointer 10 is provided which moves along a graduation scale 14 covering a full circle and said pointer is capable of moving over an angle of more than 360°. The numeral chart or dial 16 in this case also carries only the numerals for certain principal graduation marks of the fixed graduation scale and said numerals will appear in accordance with the load put upon the weighing mechanism in a window or opening 24 arranged above one of the principal graduation marks. The correct number will always appear in those windows which are adjacent to the position of the pointer for the time being.

It will be seen that the accuracy and precision of the making of the dial will in this case not be very great and this point is important as it allows the manufacturing of numeral charts or dials in series without the necessity of adjusting the weighing mechanism afterwards for a correct reading. It is not very material whether the numeral which has to mark the principal graduation marks of the scale appears entirely in the middle above said graduation scale or whether a slight deviation to the right or left occurs.

Therefore this method has marked advantages over all previous methods as much difficult labour for adjusting the scale after manufacturing is saved. The inaccuracy that can be tolerated will in this case be by far greater than that which would be tolerable in other cases.

In the modification shown in Figs. 5 and 6 a weighing apparatus with a double pointer 10 is shown, said pointer playing upon a graduation scale covering half a circle. The arrangement is similar to that in the other figures and it comprises a pendulum carrying a counterpoise 6 which oscillates around the axis of the shaft 4. On the shaft 4 an eccentric cam or disk 5 is fixed over which runs the steel band or steel rod 3 for the load pan. The shaft 4 is carried by the bearing 27. Upon it is secured a driving segment 7 for the indicator shaft 9 which is journalled within the frame in the same way as the shaft 4. The bearings for the indicator shaft 9 are ball bearings 28 which are carried by two beams 29. Between the two bearings the driving mechanism for the pointer is arranged and said driving mechanism consists of a segment which is driven by means of a steel band from a segment on the shaft 4.

Instead of using a steel band as shown in Figs. 1 and 2 it is also possible to use a toothed segment 7 driving a toothed wheel 8 keyed upon the indicator shaft 9.

Both ends of the indicator shaft 9 are surrounded by a hollow sleeve 21 through which the indicator shaft passes. These sleeves form a hollow shaft and are journalled themselves within ball bearings 30, carried by suitable supports 31. Each of the hollow shafts or sleeves 21 has a projection or bracket 32 and these projections or brackets carry themselves further projections 33 provided with flanges 34. When said flanges are fixed to each other said projections 33 form one transverse piece and the parts are held together by means of a bolt 35. By this means the two sleeves 21 together with their projections and brackets are united to form one piece.

The numeral chart 16 is fixed directly on the hollow sleeve or on the bracket 32 depending therefrom and the numeral chart carries as already explained the numerals for the higher units of the graduation scale. The sleeves 21 are driven by means of the segment 18 fixed upon one of said sleeves. Driving is effected by means of the steel band 19 which is fixed to a segment 17 on the shaft 4. The pointers 10 are mounted at the ends of the indicator shaft 9 and preferably a double pointer is used of which, however, only one half is operating for the time being.

The pointers play upon the graduation scale 14 spreading over an arc of 180° and carry a fixed graduation upon which also the units of lower order (for instance dekagrams) are marked. Above the graduation openings or windows 24 are arranged into which the numerals written upon the chart or dial 16 may enter. These numerals are only those to be ascribed to the higher units for instance kilograms.

To each window 24 corresponds a series of numerals which is also arranged along a half circle and one numeral from that series will for the time being enter into the window and thus ascribe the correct value to one of the principal graduation marks.

As will be seen from the drawings the numeral chart or dial is driven from the counterpoise 6 in the same way as the pointer is driven from said counterpoise. Therefore only the correct gear ratio has to be chosen in order that the numeral corresponding to the deflection of the pointer and also to the deflection of the pendulum carrying the counterpoise is shifted for such a distance that it may appear in the window.

If for instance a weight having more than one kilogram is put upon the load pan the pointer as well as the numeral chart or dial 16 will begin to move. The chart is moved for a small angle and one of its numerals, for instance the numeral 2, now enters the window 24 which faces the part of the graduation scale upon which the pointer is pointing for the time being.

Care is to be taken that the numerals are arranged upon the dial or chart in such a way that they will appear in the window when the pointer is moving just upon that part of the graduation situated directly under said window. It is immaterial what numerals appear in the other windows before which the pointer is not playing; for reading of course takes place only where the pointer is moving and it is only necessary that the two windows between which the pointer is playing display the correct numerals.

It will be seen from the above that it is possible to read upon the scale the smaller as well as the higher units at one glance and that no error is possible. The arrangement may be such that the brackets 33 and the bolts 35 which connect the two sleeves 21 are mainly provided for the purpose to be able to move two numeral charts or dials at the same time which are arranged on both sides of the weighing mechanism, so that one of said graduations may be inspected by the customer while the other graduation faces the dealer. Thereby corresponding readings can be taken from both sides of the weighing mechanism.

Figure 7:
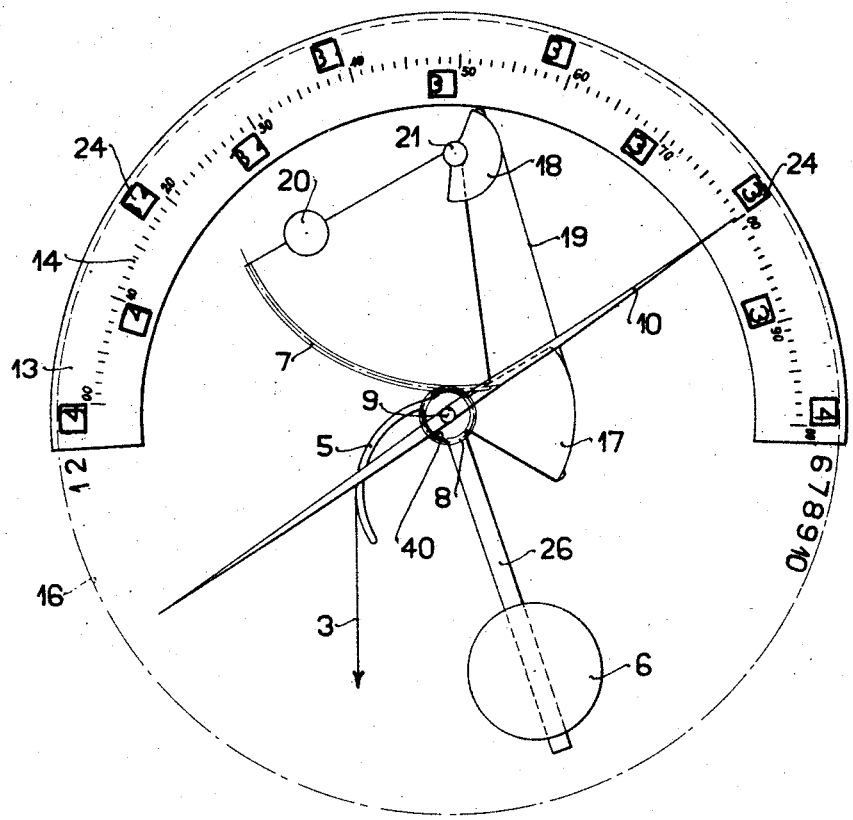
Fig. 7 shows a further modification of a weighing apparatus with a pendulum lever, wherein the pendulum is suspended co-axially with the axis of the pointer and in which the numerals relating to the higher units are also displayed within windows, openings or slots arranged above the principal subdivisions of the scale.

The modification shown in Fig. 7 is similar to that shown in Figs. 5 and 6, but in this case the counterpoise 6 on the pendulum 26 is mounted upon a sleeve 40 that is journalled by means of ball bearings on the indicator shaft itself. This arrangement is perfectly centered around the indicator shaft and the center of gravity of the whole arrangement will therefore be in the middle of the head of the weighing mechanism in immediate vicinity of the indicator shaft itself. The counterpoise 6 on the pendulum 26 is in this case also connected with an eccentric cam 5 which carries the band or rod leading to the load pan. The sleeve 40 carrying the pendulum carries the segment 17 which moves a second segment 18 by means of a steel band 19. The second segment is fixed on a small shaft 21 arranged above the indicator shaft and this shaft in its turn carries a small toothed segment 7 which drives a toothed wheel 8 keyed upon the indicator shaft 9. Said segment is provided with a small weight 20 which will secure the return of the pointer by its own gravity.

The numeral chart or dial 16 is connected with the pendulum 26 or with the sleeve carrying said pendulum and that dial carries the value numerals for the larger units. A double pointer 10 plays upon a graduation scale 14 covering an arc of 180° but in this case in order to be able to arrange a great number of windows, said windows are alternately arranged above and below the graduation scale. Therefore the numeral chart or dial also carries series of numerals above and below that graduation scale and it is thus possible to have a window arranged for instance at each 10th unit without being compelled to enlarge the diameter of the graduation scale.

When the load is put upon the load pan the arm 5 will be driven from the steel band 3 and thereby the pendulum is swung around in such a position that it will counterbalance the load. The movement of the pendulum will drive the pointer by means of the segments 17 and 18, the toothed segment 7 and the toothed wheel 8. The pointer 10 is therefore advanced until it reaches that mark of the graduation which corresponds to the weight. The swinging out of the pendulum 26 has also rotated the numeral chart or dial 16 fixed to the sleeve 40 and therefore the numerals upon that chart or dial will appear in the windows. As shown in the drawing the correct number, for instance 3, will appear in all the windows adjacent the position into which the pointer is resting. Also in the other windows numerals will appear more or less and especially in this case the numerals 3 and 4. This is, however, not disturbing because the reading is only taken at the place to which the pointer has been advanced and moreover everyone is accustomed to see varying numerals upon a graduation scale.

The numeral chart or dial 16 may carry a small weight 36 (Fig. 5) which when the counterpoise is swung in one direction will be swung in the opposite direction so that it will ensure correct position of the parts even when the weighing mechanism should be in inclined position. If for instance the weighing mechanism is wrongly mounted so that it has an inclination to the horizontal, the small weight will act as an additional weight which will compensate half of the force transmitted by the load pan due to that inclined position so that a correct reading of the pointer may be obtained in spite of that inclined position.

As will be seen from the above description, the graduation scale may be reduced to half a circle if two pointers are used without reducing the weighing range of the weighing mechanism. If the number of pointers is increased the arc occupied by the graduation scale can be still reduced. The weighing range, however, remains the same and the distance between two adjacent graduation marks will be the same as for instance in a weighing mechanism adapted for a very small weighing range only. For instance the weighing mechanism may be capable of indicating weights up to 10 kg. while the distance between two adjacent graduation marks is the same as that of an ordinary scale capable of weighing 1 kg. only. No error is possible because the correct numerals will always appear in the windows which are in immediate vicinity of the position occupied by the pointer, said position corresponding to the weight put upon the scale pan.

What I claim is:—

1. In a weighing scale having a load balancing weighted pendulum, an automatic indicating device comprising a fixed scale having graduations without value numerals, a pointer movable over the scale, a separate chart containing value numerals for the graduated scale and capable of moving the numerals in juxtaposition to the scale, and means for moving the chart continuously during weighing operation in proportion to the movement of the weighted pendulum, thereby ascribing varying values to the marks of the fixed graduation scale.

2. In a weighing scale having a load balancing weighted pendulum, an automatic indicating device comprising a fixed scale having graduations without value numerals, a pointer movable over the scale, a dial carrying a chart containing value numerals for the graduated scale and positive driving mechanism acting upon said dial and inserted between the latter and the weighted pendulum for moving the chart continuously during weighing operations in proportion to the movement of said pendulum.

3. In a weighing scale having a load balancing weighted pendulum, an automatic indicating device comprising a fixed scale, having graduations without value numerals, a pointer movable over the scale, a separate chart containing value numerals for the graduated scale arranged along cycloidal curves and movable in juxtaposition to the scale, and means for moving the chart continuously during weighing operation in proportion to the movement of the pendulum, thereby ascribing varying values to the marks of the fixed scale.

4. In a weighing scale having a load balancing weighted pendulum, an automatic indicating device comprising a fixed disk having display apertures, arranged over graduation marks forming a scale on the disk, a pointer movable over the scale, a separate chart containing value numerals for the graduated scale, adapted to appear in said apertures, and means for moving the chart continuously during weighing operation in proportion to the movement of the pendulum whereby the numerals alternately appear in said apertures.

5. In a weighing scale of the character described, a load balancing weighted pendulum, an automatic indicating device comprising a pointer rotatable on an axis, an indicator shaft carrying the pointer, a fixed member having a curved series of graduations and a plurality of apertures in proximity to the latter, a separate dial having value numerals thereon and rotatable about the axis of the pointer, and means for rotating the dial in accordance with the oscillations of the pendulum whereby the numerals alternately appear in said apertures.

6. In a weighing scale according to claim 5, in which the axis of oscillation of the pendulum coincides with the axis of the indicator shaft and with the center of rotation of the dial and with a direct connection between said pendulum and said dial.

In testimony that I claim the foregoing as my invention, I have signed my name.

RUDOLF JOKSCH.